April 21, 1959     E. C. SPARKS, JR     2,883,625
SUPPRESSED CARRIER MODULATOR
Filed March 16, 1956
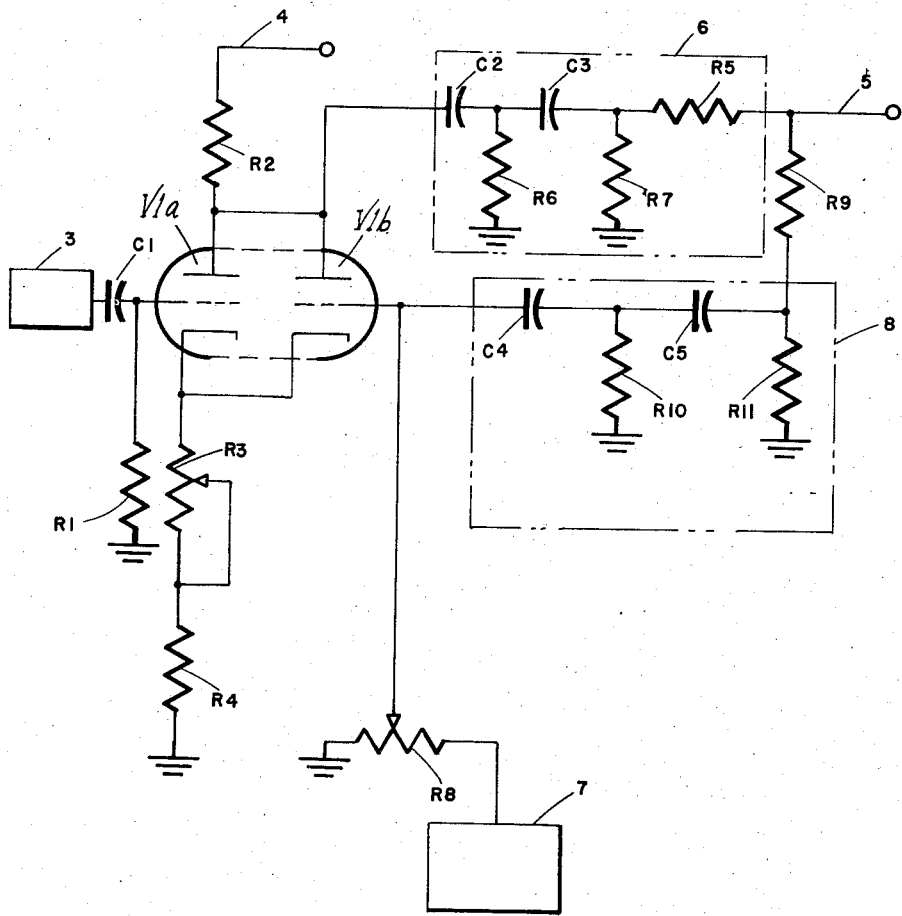
INVENTOR.
*Earl C. Sparks, Jr.*
BY
ATTORNEYS

United States Patent Office 2,883,625
Patented Apr. 21, 1959

2,883,625

SUPPRESSED CARRIER MODULATOR

Earl C. Sparks, Jr., Bedford, Mass., assignor, by mesne assignments, to the United States of America as represented by the Secretary of the Navy Application March 16, 1956, Serial No. 572,167

1 Claim. (Cl. 332—44)

The present invention relates to a novel and improved electronic circuit and more particularly to a novel and improved single tube suppressed carrier modulator circuit which is particularly useful in testing the comparator stages of a simultaneous lobing radar system.

In conventional simultaneous lobing radar systems of the phase amplitude comparator type the energy reflected from a target is received by symmetrically-displaced antennas and directed into two similar sections of a square waveguide of a thruplexer. The vertically polarized components of the two signals are then independently conveyed to opposite ends of a standard hybrid T that has a crystal detector in its series and shunt arms. These detectors are mounted on the waveguide such that one receives the signals from the two antennas in phase and detects the sum of the two signals while the other receives the two signals 180 degrees out of phase and detects the difference therebetween. After this addition and subtraction operation is effected, the amplitude and phase of the signals are compared in conventional comparator circuits to obtain desired information relating the elevational and azimuth characteristics of the target.

Although it often becomes necessary and desirable to test the operation of the above mentioned comparator circuits of the radar system, considerable difficulty has been experienced hereto in providing apparatus which simulates the sum and difference signals produced at the output of the hybrid T and thereby permits improved control of the comparator circuit input signal during the test operation.

It is a principal object of the present invention to provide a novel and improved electronic circuit from which a suppressed carrier modulated signal may be obtained.

It is a further object of the present invention to provide a novel and improved single tube suppressed carrier modulator circuit which is particularly useful in testing the comparator stages of a simultaneous lobing radar system.

It is still a further object of the present invention to provide a novel and improved suppressed carrier modulator circuit for a simultaneous lobing radar system which is relatively simple in construction and yet efficient and reliable in operation.

Other objects and many of the attendant advantages of this invention will be readily appreciated as the same becomes better understood by reference to the following detailed description when considered in connection with the accompanying drawing wherein the single figure is a schematic circuit diagram of a preferred embodiment of the present invention.

In general the improved suppressed carrier modulator circuit of the present invention includes means for modulating a carrier signal with a relatively low frequency modulating signal, means for inverting the modulated carrier signal, and means for mixing the inverted modulated carrier signal with the unmodulated carrier signal. It has been found that the desired double side band signal may be obtained in this manner with such apparatus.

A preferred embodiment of the present invention is illustrated in the figure of the drawing. As shown therein, a relatively low frequency modulating signal is delivered to the control grid of tube V–1a from its source 3 through condenser C–1 and resistor R–1. The plate circuit of tube V–1a extends from the positive 200 volt supply line 4 through resistor R–2, the tube, variable resistor R–3, and resistor R4 to ground. The plate of tube V–1b, which is tied to the plate of tube V–1a, is coupled to the output terminal 5 of the circuit through the filter network 6 which includes the series connected condensers C–2 and C–3 and resistor R–5 and the shunt resistors, R–6 and R–7. The control grid of tube V–1b is coupled to the carrier signal source 7 through potentiometer R–8 and to the output terminal 5 through the filter network 8 and resistor R–9. The filter network 8 includes the series connected condensers C4 and C5 and the shunt connected resistors R–10 and R–11.

In operation the modulating signal which is applied to the control grid of tube V–1a causes the common cathode of the tube to follow the signal in frequency and phase. The carrier signal which is applied through potentiometer R–8 to the control grid of tube V–1b is then amplitude-modulated by the signal existing at the cathode. The amplitude-modulated carrier signal developed at the plate of tube V–1b is then fed through the filter network 6 to the output terminal of the circuit at 5 where it is mixed with the input carrier signal which is fed from the control grid of tube V–1b through filter network 8 and resistor R–9. Since the grid voltage of tube V–1b is always 180 degrees out of phase with its plate voltage, the carrier of the modulated signal is cancelled by the carrier of the unmodulated signal, and a double sideband suppressed carrier signal is obtained. It has been found this double sideband signal may be readily used to simulate the sum and difference signals fed into the comparator circuits of simultaneous lobing radar apparatus and facilitate testing and/or calibrating the same without training the apparatus on an actual target.

Although the suppressed carrier modulator circuit of the present invention has been found particularly useful in testing and calibrating the comparator circuits of radar apparatus as described above, it is to be understood that the modulator circuit could be used for any other suitable purpose without departing from the spirit or scope of the present invention.

Obviously many modifications and variations of the present invention are possible in the light of the above teachings. It is therefore to be understood that within the scope of the appended claims the invention may be practiced otherwise than as specifically described.

What is claimed is:

Suppressed carrier modulator apparatus comprising a common cathode twin-triode circuit having a common plate circuit; a variable resistor in said common cathode circuit; a modulator signal source; means for coupling the modulator signal source to the control grid of one of the twin triodes; a carrier signal source; means for coupling the carrier signal source to the control grid of the other twin-triode; a first filter network coupled to the plate of the said other twin-triode; a second filter network coupled to the control grid of the said other twin-triode; and means for coupling the output signals of the said first and second filter networks.

References Cited in the file of this patent

UNITED STATES PATENTS

| | | |
|---|---|---|
| 1,558,909 | Nichols | Oct. 27, 1925 |
| 1,574,779 | Affel | Mar. 2, 1926 |
| 1,795,484 | Farrington | Mar. 10, 1931 |
| 2,490,448 | Lott | Dec. 6, 1949 |